United States Patent
Hillerup Lyhne (10) Patent No.: US 10,801,504 B2
(45) Date of Patent: *Oct. 13, 2020

(54) MULTI-PUMP CONTROL SYSTEM WITH POWER CONSUMPTION OPTIMIZATION

(71) Applicant: GRUNDFOS HOLDING A/S, Bjerringbro (DK)

(72) Inventor: Casper Hillerup Lyhne, Aabyhøj (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 90 days.

This patent is subject to a terminal disclaimer.

(21) Appl. No.: 16/034,923

(22) Filed: Jul. 13, 2018

(65) Prior Publication Data

US 2019/0017513 A1    Jan. 17, 2019

(30) Foreign Application Priority Data

Jul. 14, 2017 (EP) .................................. 17181341

(51) Int. Cl.
*F04D 15/00* (2006.01)
*F04D 15/02* (2006.01)
(Continued)

(52) U.S. Cl.
CPC ........... *F04D 15/0066* (2013.01); *F04D 1/04* (2013.01); *F04D 13/14* (2013.01);
(Continued)

(58) Field of Classification Search
CPC .... F04D 15/00; F04D 15/029; F04D 15/0088; F04D 15/0066; F04D 1/04; F04D 13/14;
(Continued)

(56) References Cited

U.S. PATENT DOCUMENTS

| 7,480,544 B2 | 1/2009 | Wang et al. |
| 8,381,679 B2 * | 2/2013 | Idensjo ................... A01J 5/047 |
| | | 119/14.02 |

(Continued)

FOREIGN PATENT DOCUMENTS

| CN | 102162443 A | 8/2011 |
| CN | 104619991 A | 5/2015 |

(Continued)

OTHER PUBLICATIONS

Machine translation (generated Dec. 12, 2019) of EP 0735273A1 (Year: 1996).*

(Continued)

*Primary Examiner* — M. N. Von Buhr
(74) *Attorney, Agent, or Firm* — McGlew and Tuttle, P.C.

(57) ABSTRACT

A multi-pump control system includes a control module, a processing module, a communication interface, and a storage module. The control module is configured to run a zero flow configuration cycle by either ramping up the speed of at least one pump in addition to a subset j of i pumps of a multi-pump system until the communication interface receives a signal change indicative of the at least one pump starting to contribute to the total flow, wherein the processing module is configured to determine an approximated pump characteristic or power consumption or ramping down the speed of at least one pump of a subset j of i pumps of a multi-pump system until the communication interface receives a signal change indicative of the at least one pump stopping to contribute to the total flow, wherein the processing module is configured to determine an approximated pump characteristic and/or power consumption.

29 Claims, 4 Drawing Sheets

(51) Int. Cl.
*F04D 13/14* (2006.01)
*F04D 1/04* (2006.01)
*G05B 15/02* (2006.01)
*G06F 17/14* (2006.01)
*E03B 5/00* (2006.01)

(52) U.S. Cl.
CPC ....... *F04D 15/0088* (2013.01); *F04D 15/029* (2013.01); *G05B 15/02* (2013.01); *G06F 17/14* (2013.01); *E03B 5/00* (2013.01)

(58) Field of Classification Search
CPC ..... G05B 15/02; G06F 17/14; F05D 2260/85; E03B 5/00
See application file for complete search history.

(56) References Cited

U.S. PATENT DOCUMENTS

| | | |
|---|---|---|
| 2003/0235492 A1 | 12/2003 | Mirsky et al. |
| 2008/0067116 A1 | 3/2008 | Anderson et al. |
| 2009/0095545 A1* | 4/2009 | Crabtree ................ B60K 25/02 180/53.8 |
| 2015/0148972 A1 | 5/2015 | Blaumann et al. |
| 2019/0017511 A1* | 1/2019 | Hillerup Lyhne ........ F04D 1/04 |
| 2019/0017512 A1* | 1/2019 | Hillerup Lyhne ........ F04D 1/04 |

FOREIGN PATENT DOCUMENTS

| | | |
|---|---|---|
| CN | 106461444 A | 2/2017 |
| CN | 109253092 A | 1/2019 |
| DE | 102014222962 A1 | 5/2016 |
| EP | 0 905 596 A2 | 3/1999 |
| EP | 2469094 A2 | 6/2012 |
| KR | 100550489 B1 | 2/2006 |
| KR | 2009 0035791 A | 4/2009 |

OTHER PUBLICATIONS

Machine translation (generated Dec. 17, 2019) of EP 2469094A2 (Year: 2012).*

* cited by examiner

MULTI-PUMP CONTROL SYSTEM WITH POWER CONSUMPTION OPTIMIZATION

CROSS REFERENCE TO RELATED APPLICATIONS

This application claims the benefit of priority under 35 U.S.C. § 119 of European Application 17181341.3, filed Jul. 14, 2017, the entire contents of which are incorporated herein by reference.

TECHNICAL FIELD

The present disclosure relates generally to control systems for a plurality of pumps, in particular a plurality of speed-controlled wet rotor centrifugal pumps. Such a plurality of pumps may be used in a pump station of a water supply network.

BACKGROUND

Typically, a pump station of a water supply network may comprise a plurality of identical or different pumps installed in parallel to each other to provide a required fluid flow q and head $\Delta p$ (pressure difference). Depending on the required flow and head, there are numerous possibilities for a control system to operate a multi-pump system with N pumps, wherein N≥2. The multi-pump system may have $2^N-1$ different options to run the system with different subsets of pumps. However, depending on the required flow and head, the overall power consumption is not the same for all subsets. Thus, in order to run the multi-pump system with the least energy consumption, the multi-pump control system may want to choose to run the system with the subset of pumps having the least power consumption. For instance, if half of the full load capacity of a system of four identical pumps is required, the control system has one option to run all four pumps at about half load, or six options to run two pumps at about full load, or 4 options to run three pumps at about ⅔ load. Depending on the pump characteristics, one of these options may be the subset with the least power consumption.

For instance, U.S. Pat. No. 7,480,544 B2 describes a system of energy-efficient and constant-pressure fluid transport machines coupled in parallel for supplying a pipe system with known nodes and pipe sections.

US 2003/0235492 A1 relates to a method and apparatus for automatic control of multiple pumps operated either in parallel or in series.

US 2015/0148972 A1 describes a device and a method for operating multiple centrifugal pumps with determined number of pumps with least energy consumption.

All of the known control systems or methods require stored pre-knowledge of the pump characteristics provided by the pump manufacturer. However, due to manufacturing tolerances, wear and/or fouling, the real current pump characteristics may be different from the stored information in the control logic. The pump characteristics may change over time and may be different between the pumps. Thus, the control system may consider pumps as identical where in fact their current pump characteristics differ significantly. Such a misinformation leads to wrong decisions about which subset of pumps is the most energy-efficient for supplying a required flow and head.

In case the control system is to be retro-fitted to an existing multi-pump system, there may even be none or insufficient information available on the pumps in the first place. The multi-pump system may comprise different sizes or kinds of pumps, where it can be assumed that the multi-pump system comprises subsets of at least two pumps providing the same flow at the same speed. It should also be noted that a flow measurement by sensors is in general not desired, because installation and maintenance of flow sensors is expensive. Thus, there is typically only one system flow measurement or no measured current flow value at all available. Furthermore, the pump characteristic and/or power consumption at zero flow is unknown.

SUMMARY

In contrast to known multi-pump control systems, embodiments of the present disclosure provide a control system and method to identify the pump characteristic and/or power consumption at zero flow in absence of pre-knowledge of the pump characteristics provided by the pump manufacturer.

In accordance with a first aspect of the present disclosure, a multi-pump control system is provided comprising a control module, a processing module, a communication interface, and a storage module, wherein the control module is configured to a) run a zero flow configuration cycle by ramping up the speed of at least one pump in addition to a subset j of i pumps of a multi-pump system running at a speed $\omega_j$ until the communication interface receives a signal change indicative of the at least one pump starting to contribute to the total flow, and wherein the processing module is configured to determine an approximated pump characteristic $\Delta p \sim \omega_0^2$ and/or power consumption $P \sim \omega_0^3$, wherein $\omega_0$ is the speed of the at least one ramped-up pump in the moment it starts to contribute to the total flow; and/or b) run a zero flow configuration cycle by ramping down the speed of at least one pump of a subset j of i pumps of a multi-pump system running at a speed $\omega_j$ until the communication interface receives a signal change indicative of the at least one pump stopping to contribute to the total flow, and wherein the processing module is configured to determine an approximated pump characteristic $\Delta p \sim \omega_0^2$ and/or power consumption $P \sim \omega_0^3$, wherein $\omega_0$ is the speed of the at least one ramped-down pump in the moment it stops to contribute to the total flow.

Optionally, the pressure is held essentially constant during the ramping up/down of the at least one pump. In option a), i.e. when at least one pump is ramped up in addition to an already running subset j, the subset j may provide an essentially constant pressure and the ramped-up pump does not contribute to the flow until the speed $\omega_0$ is reached, which is just sufficient to provide that constant pressure. Analogously, in option b), i.e. when at least one pump of a running subset j is ramped down, the subset j may provide an essentially constant pressure and the ramped-down pump still contributes to the flow until its speed falls below the speed $\omega_0$ which is at least necessary to provide that constant pressure. In both cases, this causes a sudden signal change that may show as a spike or steep drop in a diagram in which the speed, the pressure or the power consumption is recorded over the ramping time.

Optionally, the processing module may be configured to identify the received signal change by using a change detection algorithm, for instance a cumulative sum (CU-SUM) algorithm. Optionally, the processing module may be configured to identify the received signal change by determining if the absolute value of the gradient in head $\Delta p$, speed $\omega_j$, and/or power consumption P is equal to or exceeds a pre-determined threshold value.

Thus, the parameters c and z in $\Delta p = c\omega_i^2$ and/or $P = z\omega_i^3$ as well as the speed $\omega_0$ may be determined by conducting one or more zero flow configuration cycles.

However, ramping up or down a pump in a multi-pump system always represents a certain disturbance in the fluid network. Some fluid networks are sensitive to transients in flow or pressure having a high gradient, e.g. chilling circuits. Apart from that, high gradient transients in flow or pressure are generally more energy consuming than smooth transients. It is thus desired during normal operation of the multi-pump system to minimize the disturbances caused by ramping up or down pumps.

Therefore, the control module may be further configured to a) ramp up the speed of k pumps in addition to a subset j of i pumps of a multi-pump system comprising N pumps and running at a speed $\omega_j$ providing a total head $\Delta p$, wherein $N \geq 2$, $1 \leq k < N$ and $1 \leq i < N$, wherein the control module is configured to ramp down the i pumps of the subset j from the speed $\omega_j$ to a lower speed $\omega_m$, wherein the speed $\omega_m$ is the speed required for a subset m of i+k pumps to provide the total head $\Delta p$; and/or b) ramp down the speed of k pumps of a subset j of i pumps of a multi-pump system comprising N pumps and running at a speed $\omega_j$ providing a total head $\Delta p$, wherein $N \geq 2$, $1 \leq k < i$ and $1 < i \leq N$, wherein the control module is configured to ramp up the i−k pumps of a residual subset r from the speed $\omega_j$ to a higher speed co, wherein the speed $\omega_r$ is the speed required for a residual subset r of i−k pumps to provide the total head $\Delta p$.

Optionally, the control module may be configured to keep the total head $\Delta p$ constant while ramping up/down. Optionally, the control module may be configured to ramp up/down following at least one pre-determined model curve. Parameters a, b, c, x, y and z in polynomials $$\Delta p_j(q, \omega_j) = a\left(\frac{q}{i}\right)^2 + b\left(\frac{q}{i}\right)\omega_j + c\omega_j^2 \text{ and}$$

$$P_j(q, \omega_j) = x\left(\frac{q}{i}\right)^2 \omega_j + y\left(\frac{q}{i}\right)\omega_j^2 + z\omega_j^3,$$

wherein the parameters are indicative of an approximated pump characteristic $\Delta p = f(q, \omega_j)$ and/or power consumption $P = f(q, \omega_j)$, may be determined during configuration cycle(s) as described below and used to determine the pre-determined model curve. The speed $\omega_0$ determined during a zero flow configuration cycle may be used to coordinate the ramping up (of the i added pumps or the residual subset r) and the simultaneous ramping down (of the running subset j or the k shut-down pumps) in such way that the combined flow and pressure of all running pumps during ramping up/down is essentially constant. It is thus not necessary to react to a sudden transient in flow and/or pressure after ramping up/down, because knowledge of the pre-determined model curve facilitates avoiding such a sudden transient in the first place and to establish the desired speed, flow and pressure at the end of ramping up/down.

Optionally, the control module may be configured to run n different subsets of i pumps of a multi-pump system comprising N pumps during n different configuration cycles at a speed $\omega_j$, wherein $N \geq 2$, $2 \leq n \leq 2^N - 1$ and $1 \leq i \leq N$, wherein each configuration cycle $j \in \{1, \ldots, n\}$ is associated with a subset $j \in \{1, \ldots, n\}$ and a speed $\omega_j$. The communication interface is configured to receive signals indicative of operational parameters from each subset j during the associated configuration cycle j. The processing module is configured to determine an approximated pump characteristic $\Delta p = f(q, \omega_j)$ based on the received signals for each subset j and under the assumption that the i pumps of each subset j share the same part q/i of a reference flow q. The storage module is configured to store the approximated pump characteristic $\Delta p = f(q, \omega_j)$ or parameters indicative thereof.

It should be noted that j is used herein as an index to distinguish different subsets and configuration cycles from each other. The number of pumps of a subset j is given by i. The number of configuration cycles is given by n. As the subset j changes between the configuration cycles, the same index j may be used to identify the subset and the configuration cycle. The following table may illustrate this by way of an example of a system of three pumps of the same type and size. The status of all pumps may be illustrated by a binary number with N bits, where each bit represents a pump, i.e. 0 means "off", 1 means "on", and the binary weight represents the number i of pumps in the running subset j:

| Configuration cycle, i.e. j | Subset, i.e. j | Number of pumps in running subset, i.e. i | Status of all N = 3 pumps; 0 is "off", 1 is "on" |
|---|---|---|---|
| 1 | 1 | 1 | 001 or 010 or 100 |
| 2 | 2 | 2 | 011 or 101 or 110 |
| 3 | 3 | 3 | 111 |

The number n of configuration cycles depends on how precisely the pump characteristic $\Delta p = f(q, \omega_j)$ is to be approximated. In the example of the above table, there are three options to run the first (j=1) configuration cycle with one (i=1) pump running. There are also three options to run the second (j=2) configuration cycle with two (i=2) pumps running. Preferably, the number i of running pumps may differ between the configuration cycles. In particular, if it can be assumed that all pumps have the same, but unknown pump characteristic, the following second-order polynomial may be used as an approximation:

$$\Delta p_j = a\left(\frac{q}{i}\right)^2 + b\left(\frac{q}{i}\right)\omega_j + c\omega_j^2,$$

where a, b and c are parameters indicative of the pump characteristic. The reference flow q may be a measured or a normalized value, i.e. it may be arbitrarily set to q=1. The speed $\omega_j$ is an operational parameter received by the communication interface from each subset j during the associated configuration cycle j. The head $\Delta p_j$ may be measured by a pressure sensor and received by the communication interface as an operational parameter during the associated configuration cycle j. Alternatively or in addition, the speed $\omega_j$ may be set to achieve a certain head $\Delta p_j$ and to keep the head $\Delta p_j = \Delta p$ constant for all n configuration cycles. Thereby, the configuration cycles allow an approximation of the current pump characteristic for determining which subset of pumps is the most energy-efficient to provide a required flow q and head $\Delta p$.

Optionally, the processing module may be configured to determine an approximated pump power consumption $P = f(q, \omega_j)$ based on the received signals for each subset j and under the assumption that the i pumps of each subset j share the same part q/i of the reference flow q, wherein the storage module may be configured to store the approximated power consumption $P=f(q, \omega_j)$ or parameters indicative thereof. Analogously to the pump characteristic $\Delta p=f(q, \omega_j)$, in particular if it can be assumed that all pumps of a subset have the same, but unknown power consumption, the following second-order polynomial may be used as an approximation:

$$P_j = x\left(\frac{q}{i}\right)^2 \omega_j + y\left(\frac{q}{i}\right)\omega_j^2 + z\omega_j^3,$$

where x, y and z are parameters indicative of the power consumption. Thus, the approximated power consumption may be used as an alternative or in addition to the approximated pump characteristic for determining which subset of pumps is the most energy-efficient to provide a required flow or head.

Thus, optionally, the processing module may be configured to determine a subset k with the least power consumption for a required load based on the approximated power consumption $P=f(q, \omega_j)$ and/or the approximated pump characteristic $\Delta p=f(q, \omega_j)$ stored in the storage module. Consequently, the control module may be configured to operate the multi-pump system with the determined subset k having the least power consumption for a required load.

Optionally, the control module may be configured to run the i pumps of a subset j with the same speed $\omega_j$ during a configuration cycle j, wherein the speed $\omega_j$ of the i pumps of subset j in configuration cycle j differs from the speed (Ok of s pumps of a subset k in another configuration cycle k, wherein j≠s, wherein a total head $\Delta p$ generated by the multi-pump system is essentially the same for both configuration cycles j, k. In other words, the speeds $\omega_j$ and Wk may be set to achieve a certain constant head $\Delta p_j = \Delta p_k = \Delta p$ for all n configuration cycles.

Optionally, the processing module may be configured to determine the approximated pump characteristic $\Delta p=f(q, \omega_j)$ and/or power consumption $P=f(q, \omega_j)$ by a least squares method if the number n of configuration cycles is equal to or exceeds the number of parameters to be determined. Thus, if the parameter set is overdetermined, "averaged" parameters may be found by a polynomial regression analysis or a similar statistical technique to exploit the redundant information from the configuration cycles. Thereby, wear, fouling, other forms of efficiency degradation or differences between the pumps due to manufacturing tolerances may be smoothed and thereby taken in consideration. Furthermore, outliers may be determined during redundant configuration cycles in order to neglect those in the averaging and/or to identify and ban low efficiency pumps of the multi-pump system. Such identified low efficiency pumps may be indicated for service, repair or replacement.

The approximation by a second order polynomial is best around the operating points of highest efficiency, because the pump characteristic $\Delta p=f(q, \omega_j)$ and the power consumption $P=f(q, \omega_j)$ can be expected to be quite smooth around these preferred operating points. However, the approximation may be less accurate for operating points further away from the points of highest efficiency, in particular for a zero flow operation. However, a good approximation of the zero flow operation is useful for several reasons. Firstly, the approximations of the pump characteristic $\Delta p=f(q, \omega_j)$ and/or the power consumption $P=f(q, \omega_j)$ are more robust and more accurate if the points $\Delta p=f(0, \omega) \approx C\omega_0^2$ and/or $P=f(0, \omega) \approx z\omega_0^3$ are known. Secondly, as will be described below, the speed $\omega_0$ can be determined at which a pump being started up in addition to a running subset contributes to the total flow. Thirdly, knowing the parameters c and z is useful for a multi-pump system of two identical pumps, i.e. N=2, as there are only two options of running subsets with a different number of pumps i, i.e. j=1 (01 or 10) with i=1 and j=2 (11) with i=2.

In accordance with a second aspect of the present disclosure, a method for controlling a multi-pump system is provided comprising a)—running a zero flow configuration cycle by ramping up the speed of at least one pump in addition to a subset j of i pumps of a multi-pump system running at a speed $\omega_j$ until the communication interface receives a signal change indicative of the at least one pump starting to contribute to the total flow, and determining an approximated pump characteristic $\Delta p \sim \omega_0^2$ and/or power consumption $P \sim \omega_0^3$, wherein $\omega_0$ is the speed of the at least one ramped-up pump in the moment it starts to contribute to the total flow; and/or b)—running a zero flow configuration cycle by ramping down the speed of at least one pump of a subset j of i pumps of a multi-pump system running at a speed w until the communication interface receives a signal change indicative of the at least one pump stopping to contribute to the total flow, and determining an approximated pump characteristic $\Delta p \sim \omega_0^2$ and/or power consumption $P \sim \omega_0^3$, wherein $\omega_0$ is the speed of the at least one ramped-down pump in the moment it stops to contribute to the total flow.

Optionally, the total head and/or flow may be held essentially constant during the ramping up/down of the at least one pump. In option a), i.e. when at least one pump is ramped up in addition to an already running subset j, the subset j may provide an essentially constant pressure and the ramped-up pump does not contribute to the flow until the speed $\omega_0$ is reached, which is just sufficient to provide that constant pressure. Analogously, in option b), i.e. when at least one pump of a running subset j is ramped down, the subset j may provide an essentially constant pressure and the ramped-down pump still contributes to the flow until its speed falls below the speed $\omega_0$ which is at least necessary to provide that constant pressure. In both cases, this causes a sudden signal change that may show as a spike or steep drop in a diagram in which the speed, the pressure or the power consumption is recorded over the ramping time.

Optionally, the received signal change may be identified by determining if the absolute value of the gradient in head $\Delta p$, speed $\omega_j$, and/or power consumption P is equal to or exceeds a pre-determined threshold value. Optionally, a change detection algorithm, for instance a cumulative sum (CUSUM) algorithm, is used for identifying the received signal change.

A CUSUM algorithm is particularly useful for detecting changes in the mean value of a signal. For instance, in view of a signal diagram over time, wherein the speed, the pressure or the power consumption is the signal, the positive and negative signal differences from its mean may be summed up to a monitored quantity. If the monitored quantity is equal to or exceeds a certain threshold, the mean value can be interpreted to have changed. In order to allow for some signal noise without exceeding the threshold by noise, a constant amount may be subtracted/added from the monitored quantity for each sample. The CUSUM logic for each signal may be described be the following equations:

$$J_{i+1}^{\Delta p} = \max\left(J_i^{\Delta p} + \tau_s\left(\frac{\Delta p - \Delta p_r}{\Delta p_r} - \gamma^{\Delta p}\right), 0\right)$$

$$J_{i+1}^{\omega} = \min\left(J_i^{\omega} + \tau_s\left(\frac{\omega - \omega_r}{\omega_r} + \gamma^{\omega}\right), 0\right),$$

wherein $J^{\omega}$ is the monitored quantity for the speed CO, and $J^{\Delta p}$ is the monitored quantity for the head $\Delta p$. The signals are here normalized as well as the constant amounts $\gamma^{\omega}$ and $\gamma^{\Delta p}$. The difference in sign between $J^{\omega}$ and $J^{\Delta p}$ is due to the fact that the speed CO is expected to suddenly decrease when the ramped-up pump starts contributing to the flow q, whereas the head $\Delta p$ is expected to suddenly increase by this disturbance. Thresholds $\beta_{\omega}$ and $\beta_{\Delta p}$ may be defined to check if either $J^{\omega} < -\beta_{\omega}$ and/or $J^{\Delta p} > \beta_{\Delta p}$, and, once this is the case, to use the current values of $\omega$ and $\Delta p$ to solve the following equations for determining parameter c:

$$\Delta p = aq^2 + bq\omega + c\omega^2\big|_{q=0}$$

$$\Delta p = c\omega^2$$

$$c = \frac{\Delta p}{\omega^2}$$

The determination of parameter z may analogously be based on the second order polynomial approximation of the power consumption.

For a smooth and energy-efficient way of cutting in/out a pump with respect to an already running subset j of i pumps, the method may comprise a) — ramping up the speed of k pumps in addition to a subset j of i pumps of a multi-pump system comprising N pumps and running at a speed $\omega_j$ providing a total head $\Delta p$, wherein $N \geq 2$, $1 \leq k < N$ and $1 \leq i < N$, and ramping down the i pumps of the subset j from the speed $\omega_j$ to a lower speed $\omega_m$, wherein the speed $\omega_m$ is the speed required for a subset m of i+k pumps to provide the total head $\Delta p$; and/or b) — ramping down the speed of k pumps of a subset j of i pumps of a multi-pump system comprising N pumps and running at a speed $\omega_j$ providing a total head $\Delta p$, wherein $N \geq 2$, $1 \leq k < i$ and $1 < i \leq N$, and ramping up the i–k pumps of a residual subset r from the speed $\omega_j$ to a higher speed $\omega_r$, wherein the speed $\omega_r$ is the speed required for a residual subset r of i–k pumps to provide the total head $\Delta p$.

Optionally, the method may comprise keeping the total head $\Delta p$ constant while ramping up/down. Optionally, the ramping up/down follows at least one pre-determined model curve.

For instance, in option a), the head may be parameterized for the subset j with i running pumps before the k pumps have reached the speed $\omega_m$ as follows:

$$\Delta p_j = a\left(\frac{q_j}{i}\right)^2 + b\left(\frac{q_j}{i}\right)\omega_j + c\omega_j^2,$$

wherein $q_j$ is the flow provided by the subset j before the k added pumps contribute to the flow. The pressure differential provided by the k added pumps may be parameterized as $$\Delta p_k = a\left(\frac{q_k}{k}\right)^2 + b\left(\frac{q_k}{k}\right)\omega_k + c\omega_k^2,$$

wherein $q_k$ is the flow provided by the k added pumps before they contribute to the flow. It is most likely that only one pump is desired to be added to the subset j such that k=1 and $\Delta p_1 = aq_1^2 + bq_1\omega_1 + c\omega_1^2$. After the ramp-up, the subset j is expected to provide $$\frac{i}{i+1}$$

of the total flow q, whereas the added pump is expected to provide $$\frac{i}{i+1}$$

or the total flow q. However, before the added pump has reached the speed $\omega_m$, the subset j is expected to provide all of the total flow q, whereas the added pump is expected to provide none of the total flow q. This may be displayed as:

$$q_{js} = q$$

$$q_{je} = \frac{i}{i+1}q$$

$$q_{1s} = 0$$

$$q_{1e} = \frac{i}{i+1}q$$

wherein $q_{js}$ is the flow contribution of the subset j at the start of the ramp-up, $q_{je}$ is the flow contribution of the subset j at the end of the ramp-up, $q_{1s}$ is the flow contribution of the added pump at the start of the ramp-up, and $q_{1e}$ is the flow contribution of the added pump at the end of the ramp-up. The rate of change between $q_{js}$ and $q_{je}$ may be set to the same rate of change as the rate of change between $q_{1s}$ and $q_{1e}$ by following the conditions:

$$q_j = q_{js} + (q_{je} - q_{js})\alpha$$

$$q_1 = q_{1s} + (q_{1e} - q_{1s})\alpha,$$

wherein the ramping parameter $\alpha$ ranges from 0 at the start of the ramp-up to 1 at the end of the ramp-up. The combined total flow q is always the sum of $q_j$ and $q_1$ and thus constant during the ramp-up for all values of $\alpha$. Also the total head $\Delta p$ is constant during the ram-up for all values of $\alpha$. The corresponding speeds $\omega_j$ and $\omega_1$ may be determined as follows:

$$\omega_j = -\frac{b\frac{q_j}{i} - \sqrt{(b^2 - 4ac)\left(\frac{q_j}{i}\right)^2 + 4c\Delta p}}{2c}$$

-continued $$\omega_1 = -\frac{bq_1 - \sqrt{(b^2 - 4ac)q_1^2 + 4c\Delta p}}{2c}$$

wherein both final speeds $\omega_{je}$ and $\omega_{je}$ are the same and equal $\omega_m$ at the end of the ramp-up, i.e. when $\alpha=1$, wherein the subset m with i+1 pumps is running after the ramp-up. The above example is analogously valid for option b), in which one or more pumps of the subset j are ramped-down.

Optionally, the method may further comprise
running n different subsets of i pumps of the multi-pump system comprising N pumps during n different configuration cycles at a speed $\omega_j$, wherein N≥2, 2≤n≤$2^N$−1 and 1≤i≤N, wherein each configuration cycle j∈{1, . . . , n} is associated with a subset j∈{1, . . . , n} and a speed $\omega_j$,
receiving signals indicative of operational parameters from each subset j during the associated configuration cycle j,
determining an approximated pump characteristic $\Delta p=f(q, \omega_j)$ based on the received signals for each subset j and under the assumption that the i pumps of each subset j share the same part q/i of a reference flow q,
storing the approximated pump characteristic $\Delta p=f(q, \omega_j)$ or parameters indicative thereof.

Optionally, the method may comprise determining an approximated pump power consumption $P=f(q, \omega_j)$ based on the received signals for each subset j and under the assumption that the i pumps of each subset j share the same part q/i of the reference flow q, and storing the approximated power consumption $P=f(q, \omega_j)$ or parameters indicative thereof.

Optionally, the method may comprise determining a subset k with the least power consumption for a required load based on the approximated power consumption $P=f(q, \omega_j)$ and/or the approximated pump characteristic $\Delta p=f(q, \omega_j)$ stored in the storage module. Optionally, the method may comprise operating the multi-pump system with the determined subset k having the least power consumption for a required load.

For instance, once the approximated pump characteristic $Dp=f(q, w_j)$ is determined, it may be used to determine the most energy efficient number of pumps for operating the multi-pump system. This may even be independent of the required load, i.e. required flow and pressure. The flow can in principle be determined from either the approximated pump characteristic $Dp=f(q, w_j)$ or the approximated power consumption $P=f(q, w_j)$, however each may yield two solutions due to quadratic terms if a second order polynomial is used as approximation. It is thus preferred to use a combination of $Dp=f(q, w_j)$ and $P=f(q, w_j)$ so that quadratic terms cancel out and leave only a single solution. This is shown in equations:

$$x\Delta p - \frac{a}{\omega_i}P = x\left(a\left(\frac{q}{i}\right)^2 + b\left(\frac{q}{i}\right)\omega_i + c\omega_i^2\right) - \frac{a}{\omega_i}\left(x\left(\frac{q}{i}\right)^2\omega_i + y\left(\frac{q}{i}\right)\omega_i^2 + z\omega_i^3\right)$$

$$x\Delta p - \frac{a}{\omega_i}P = xb\left(\frac{q}{i}\right)\omega_i + xc\omega_i^2 - ay\left(\frac{q}{i}\right)\omega_i - az\omega_i^2$$

$$q = i\frac{x\Delta p - \frac{a}{\omega_i}P - (xc - az)\omega_i^2}{\omega_i(xb - ay)}$$

As all subsets j with the number of i pumps may be considered equivalent to each other, the speed $\omega_j$ is denoted here as $\omega_i$, i.e. the speed of any subset j with i pumps. The flow q in the last equation can potentially be undefined if xb=ay, which would mean that $\Delta p=f(q, \omega_i)$ and $P=f(q, \omega_i)$ both have their maximum at the same flow q. This is generally not the case, as the power consumption tends to have its maximum at high flows, whereas the head $\Delta p$ is usually maximal at low flows. Once q is determined by the equation above, it may be calculated whether it is more energy efficient to run the multi-pump system with one more or one less pump. In order to do this comparison, the resulting speed may be determined for both cases by:

$$\Delta p = a\left(\frac{q}{i}\right)^2 + b\left(\frac{q}{i}\right)\omega_i + c\omega_i^2$$

$$\omega_i = \frac{-b\left(\frac{q}{i}\right) \pm \sqrt{\left(b\frac{q}{i}\right)^2 - 4c\left(a\left(\frac{q}{i}\right)^2 - \Delta p\right)}}{2c},$$

Which may have two solutions, of which one can be ruled out, so that:

$$a < 0 \wedge c > 0 \wedge \Delta p > 0 \Rightarrow$$

$$4c\left(a\left(\frac{q}{i}\right)^2 - \Delta p\right) < 0 \Rightarrow$$

$$\left|-b\left(\frac{q}{i}\right)\right| < \sqrt{\left(b\frac{q}{i}\right)^2 - 4c\left(a\left(\frac{q}{i}\right)^2 - \Delta p\right)} \wedge c > 0 \wedge \omega_i > 0 \Rightarrow$$

$$\omega_i = \frac{-b\left(\frac{q}{i}\right) + \sqrt{\left(b\frac{q}{i}\right)^2 - 4c\left(a\left(\frac{q}{i}\right)^2 - \Delta p\right)}}{2c}$$

In order to obtain the expected speed $\omega_{i+1}$, i.e. the speed of any subset j with i+1 pumps, and the expected speed $\omega_{i-1}$, i.e. the speed of any subset j with i−1 pumps, the parameter i is replaced by i+1 and i−1, respectively, in the above equation.

Having determined the expected speeds $\omega_{i+1}$ and $\omega_{i-1}$, the corresponding power consumption $P=f(q, \omega_i)$ may be calculated. It is then possible to determine which of the following options consumes least power: 1. continuing running with the i pumps of subset j as is, 2. adding another pump to the subset j, or 3. switching off one pump of subset j. The decision logic for finding the optimal number i of running pumps may be summarized as follows:

$$i = \begin{cases} i-1 & \text{if } (i-1)P(q, i-1, \omega_{i-1}) < iP(q, i, \omega_i) \wedge i > 1 \\ i+1 & \text{if } (i+1)P(q, i+1, \omega_{i+1}) < iP(q, i, \omega_i) \wedge i < n \\ i & \text{otherwise} \end{cases}$$

Herein, $P(q, i, \omega_i)$ may be the current power consumption of the running subset j of i pumps so that it may be received as a current measured value, whereas the predicted values $P(q, i-1, \omega_{i-1})$ and $P(q, i+1, \omega_{i+1})$ may be determined from the approximated power consumption $P=f(q, \omega_i)$.

The above determination of whether it is more energy-efficient to run with one more or one less pump than with the current number of running pumps is a simple example for making use of the approximated pump characteristics and the approximated power consumption in order to run the multi-pump system more energy-efficiently. However, the configuration cycles also allow recording of parameter sets for any subset j, so that it is possible to determine the exact subset of pumps which consumes least power for a required load. For instance, one of the four options of running a subset of three out of four pumps may have shown to consume less power than the other three options. Therefore, not only the optimal number of running pumps may be determined, but also which exact subset to choose for it. However, this may change over time and with operating hours due to wear. In order to take such changes into account, regular runs of configuration cycles allow updating the approximated pump characteristics and/or the approximated power consumption.

Optionally, the above algorithm may comprise two constraining criteria, of which one avoids exceeding the maximum power of a pump and the other prevents a violation of minimum flow. In regard of the first constraint, some pumps may be equipped with a variable frequency drive (VFD) that cannot drive the pump at full speed under all conditions without violating the VFD's maximum power. If the above algorithm finds that a subset of i−1 pumps consumes less power, the remaining i−1 pumps must not exceed the VFD's maximum power, which is sometimes not known beforehand. In case the VFD's maximum power is not known, it can be determined in one or more of the configuration cycles by recording the power consumption the first time the actual speed of a pump does not follow the set speed, because the VFD's maximum power is reached. The decision algorithm may thus take the recorded maximum power into account by not ramping down a pump if the residual subset of i−1 pumps would exceed the maximum power per pump.

Regarding the second constraint, the fluid in some pumps, in particular multistage centrifugal pumps, i.e. so-called CR pumps, must not become too hot and thus a minimal flow is required. However, the flow may be an unknown quantity in an arbitrary unit in the above process and may be cut in half per pump if a pump is added to a running subset of one pump, or reduced by a third per pump if a pump is added to a running subset of two pumps. Therefore, it may not be guaranteed that sufficient flow is available for each pump. However, the flow may be "calibrated" to the unit m³/s by estimating it in a conservative way, i.e. a minimum flow may be estimated that lies below the real flow. This can be done by fairly assuming that the efficiency is above 50% at the maximum of the power consumption. At the maximum of the power consumption, the normalized flow can be deduced from the parameters as follows:

$$P = xq^2\omega + yq\omega^2 + z\omega^3 |_{\omega=1} \Rightarrow$$

$$P = xq^2 + yq + z \Rightarrow$$

$$\frac{dP}{dq} = 2xq + y$$

$$\frac{dP}{dq} = 2xq + y = 0 \Rightarrow$$

$$q = -\frac{y}{2x}$$

This flow may be fed into the equations for Δp and P, wherein the efficiency e is conservatively assumed to be 50% and a scaling ratio α is introduced as follows:

$$e = 50\% = \frac{P_{hyd}}{P} = \frac{(\alpha q)\Delta p}{P} = \alpha \frac{aq^3 + bq^2\omega + cq\omega^2}{xq^2\omega + yq\omega^2 + z\omega^3}\Big|_{\substack{\omega=1 \\ q=-\frac{y}{2x}}}$$

-continued $$\alpha = e \frac{2y^2x^2 - 8x^3z}{4cx^2y - 2bxy^2 + ay^2}$$

which yields the following calibrating conditions:

a=α²a
b=αb
c=c
x=α²x
y=αy
z=z

Under these conditions, if the efficiency was 50% at the point of maximum power, the approximated flow would be given in the unit m³/s. If the real efficiency is higher, the real flow is also higher. In case the point of maximum power violated the VFD's maximum power, the VFD's maximum power may be used yielding two solutions for the flow of which the lower solution may be conservatively chosen to be fed into the equations for Δp and P as above. Thereby, the algorithm may ensure that always a sufficient flow is available per pump.

Optionally, the method may comprise running the i pumps of a subset j with the same speed $\omega_j$ during a configuration cycle j, wherein the speed $\omega_j$ of the i pumps of subset j in configuration cycle j differs from the speed (Ok of s pumps of a subset k in another configuration cycle k, wherein j≠s, wherein a total head Δp generated by the multi-pump system is essentially the same for both configuration cycles j, k.

Optionally, the method may comprise determining the approximated pump characteristic Δp=f(q, $\omega_j$) by determining parameters a, b and c of a second order polynomial $$\Delta p = a\left(\frac{q}{i}\right)^2 + b\left(\frac{q}{i}\right)\omega_j + c\omega_j^2,$$

wherein $\omega_j$ is the speed of the i pumps of a subset j. Alternatively or in addition, the method may comprise determining the approximated power consumption P=f(q, $\omega_j$) by determining parameters x, y and z of a second order polynomial $$P_j = x\left(\frac{q}{i}\right)^2\omega + y\left(\frac{q}{i}\right)\omega_j^2 + z\omega_j^3,$$

wherein $\omega_j$ is the speed of the i pumps of a subset j.

Optionally, the method may comprise determining the approximated pump characteristic Δp=f(q, $\omega_j$) and/or power consumption P=f(q, $\omega_j$) by a least squares method if the number of configuration cycles is equal to or exceeds the number of parameters to be determined. Thus, if the parameter set is overdetermined, "averaged" parameters may be found by a polynomial regression analysis or a similar statistical technique to exploit the redundant information from the configuration cycles. Thereby, wear, fouling, other forms of efficiency degradation or differences between the pumps due to manufacturing tolerances may be smoothed and thereby taken in consideration. Furthermore, outliers may be determined during redundant configuration cycles in order to neglect those in the averaging and/or to identify and ban low efficiency pumps of the multi-pump system. Such identified low efficiency pumps may be indicated for service, repair or replacement.

The method described above may be implemented in form of compiled or uncompiled software code that is stored on a computer readable medium with instructions for executing the method. Alternatively or in addition, the method may be executed by software in a cloud-based system, i.e. one or more of the modules of the controls system, in particular the processing module may be implemented in a cloud-based system.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

Embodiments of the present disclosure will now be described by way of example with reference to the following figures of which.

DETAILED DESCRIPTION

Figure 1:
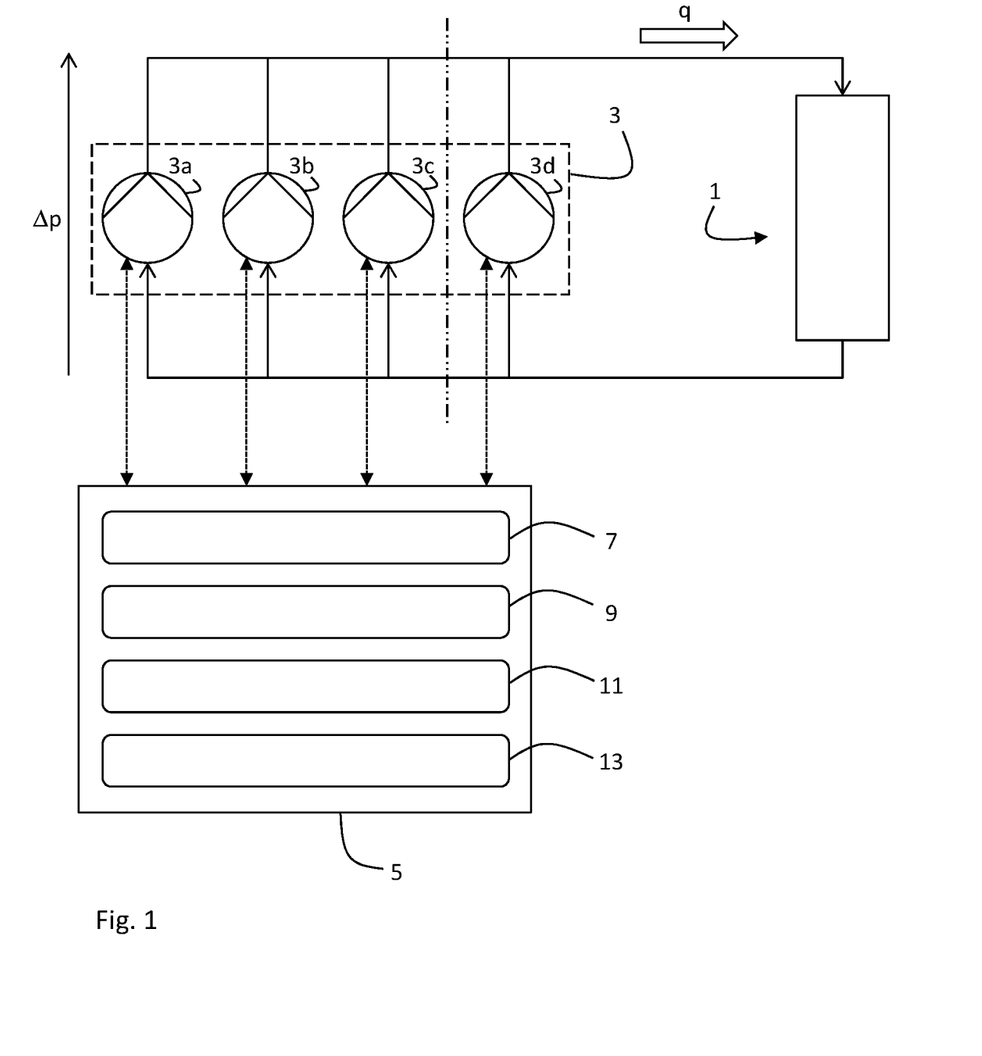
FIG. 1 is a schematic view showing a fluid supply network supplied by a multi-pump system controlled by an example of a multi-pump control system according to the present disclosure.

FIG. 1 shows a fluid network 1 supplied by a multi-pump system 3 of four pumps 3a, 3b, 3c, 3d. The fluid network 1 may, for instance, be a heating or cooling cycle. The fluid network 1 does not need to be a closed loop cycle. It may comprise two reservoirs, wherein the multi-pump system 3 is installed to pump fluid, e.g. water, from one reservoir to the other. In this example, the pumps 3a, 3b, 3c, 3d of the multi-pump system 3 are installed in parallel. The pumps 3a, 3b, 3c, 3d of this example are also of nominally the same type and size.

A multi-pump control system 5, comprising a control module 7, a processing module 9, communication interface 11, and a storage module 13, is in direct or indirect, wireless or wired communication connection with the pumps 3a, 3b, 3c, 3d. The communication interface 11 comprises one or more processor (µC, µP, DSP) and one or more transmitter/receiver with the communication interface 11 configured to send signals to and receive signals from the pumps 3a, 3b, 3c, 3d. The processing module 9 comprises one or more processor and is configured to process received signals and to execute calculations based on the received signals. The storage module 13 comprises one or more memory unit cooperating with one or more processor and is configured to store the results of the calculations. The control module 7 comprises one or more processor and is configured to control the pump operation based on the stored results by commands via the communication interface 11 to the pumps 3a, 3b, 3c, 3d. It should be noted that the control module 7, the processing module 9, the communication interface 11, and the storage module 13 may be physically distributed over the system 5 which does not have to be physically comprised within a single unit. Two or more of the modules may be combined (with common or non-common processor or processors), so that the functionality of more than one module is provided by a combined module.

For instance, the multi-pump control system 5 may constantly, regularly or sporadically check if a currently running subset of pumps is the most energy efficient operating mode to provide a required total flow q and a required total head Δp to the fluid network 1. The required total flow q and the required total head Δp may be summarized by a required total load. For example, the four pumps 3a, 3b, 3c, 3d may be able to provide a certain maximum load, of which only 75% is currently required by the fluid network 1. The multi-pump control system 5 may thus run three pumps at maximum speed having four options which of the pumps to shut down, e.g. 3d. Another option would be to run all four pumps 3a, 3b, 3c, 3d at 75% of their maximum speed. Assuming that all pumps of a running subset should run at the same speed, the multi-pump control system 5 has now five options which all may show different power consumptions.

However, running the system most energy-efficiently is not a trivial task if there is no flow measurement available and the current pump characteristics are unknown. For instance, the pump characteristics may not be given if the multi-pump control system 5 is retro-fitted to an already installed multi-pump system 3. Even if they were originally known, they could show unknown manufacturing variances, or may have changed over time due to degradations, wear, or fouling. The trick is thus to identify the most energy-efficient subset for a required load in lack of information on the current flow and the current pump characteristics.

In order to approximate the pump characteristics, the control module 7 is configured to run a certain number, i.e. n, of different configuration cycles. Each configuration cycle may be labeled with the index j. Each configuration cycle is run with a different subset of the pumps 3a, 3b, 3c, 3d. As the subset should change between the configuration cycles to gain information, each subset may be labeled with the same index j. With N=4 being the total number of pumps in the multi-pump system 3 and i as the number of pumps in the subset j, the following conditions apply: $N \geq 2$, $2 \leq n \leq 2^N - 1$ and $1 \leq i \leq N$. During each configuration cycle, the i pumps of the subset j are run at the same constant speed $\omega_j$. The speed is adapted between the configuration cycles to maintain the same total head, i.e. pressure differential Δp. The measured and monitored pressure differential $\Delta p_j$ and the recorded speed $\omega_j$ is communicated to the control module 7 by the communication interface 11, which is configured to receive signals indicative of operational parameters from each subset j during the associated configuration cycle j. The processing module is configured to determine an approximated pump characteristic in form of a second order polynomial $$\Delta p_j(q, \omega_j) = a\left(\frac{q}{i}\right)^2 + b\left(\frac{q}{i}\right)\omega_j + c\omega_j^2$$

based on the assumption that the i pumps of each subset j share the same part q/i of a reference flow q. The reference flow q may be a measured or a normalized value, i.e. it may be arbitrarily set to q=1. The storage module is configured to store the approximated pump characteristic or the parameters indicative thereof, i.e. a, b and c.

Furthermore, in each configuration cycle the power consumption $P_j=f(q,(\omega_j))$ is approximated by a second order polynomial $$P_j(q,\omega_j) = x\left(\frac{q}{i}\right)^2\omega_j + y\left(\frac{q}{i}\right)\omega_j^2 + z\omega_j^3$$

based on the assumption that the i pumps of each subset j share the same part q/i of a reference flow q. The parameters x, y and z are parameters indicative of the power consumption and stored in the storage module.

Thus, the six parameters a, b, c, x, y, and z can be determined from the six equations yielded by three configuration cycles with subsets of a different number of pumps. So, preferably, the number of running pumps i should change between the cycles. If the multi-pump system comprises only two pumps, i.e. N=2, a zero flow configuration cycle (further explained below) may be used to pre-determine the parameters c and z, so that the remaining four parameters are well determined by the four equations yielded by running a first configuration cycle with one pump and a second cycle with two pumps.

The following table may illustrate the options of running configuration cycles for the system 3 of four pumps 3a, 3b, 3c, 3d as shown in FIG. 1. The status of all pumps is illustrated by a binary number with N=4 bits, where each bit represents a pump, i.e. 0 means "off", 1 means "on", and the binary weight represents the number i of pumps in the running subset j:

| Configuration cycle, i.e. j | Subset, i.e. j | Number of pumps in running subset, i.e. i | Status of all N = 4 pumps; 0 is "off", 1 is "on" |
| --- | --- | --- | --- |
| 1 | 1 | 1 | 0001 or 0010 or 0100 or 1000 |
| 2 | 2 | 2 | 0011 or 0101 or 0110 or 1100 or 1001 or 1010 |
| 3 | 3 | 3 | 1110 or 1101 or 1011 or 0111 |
| 4 | 4 | 4 | 1111 |

Running more than three configuration cycles will overdetermine the parameter set. The total number of permutations for running subsets is $2^N-1$, i.e. in this case $2^4-1=15$. In order to take differences between pumps into account caused by manufacturing tolerances, wear or fouling, more than three configuration cycles allow an "averaging" over the pumps. Thereby, the approximation may be closer to the real pump characteristics of the pump system.

The simple case of running three configuration cycles, e.g. the first cycle (j=1) with one (i=1) pump, the second cycle (j=2) with two (i=2) pumps and the third cycle (j=3) with three (i=3) pumps, may be implemented as an algorithm
(here as a c-style meta language) as follows:

```
for (j=1; j<4; j++){
    i=j;
    if (i==1){
        Run pump #1 at 95% speed;
        Assign q=1;
        Record Δp_j, ω_j, P_j, q_j;
        Δp= Δp_j;
    }
    else if (i==2) {
        Run pumps #1 and #2;
        Regulate ω_j to set Δp_j= Δp;
        Assign q_j=1/i;
        Record Δp_j, ω_j, P_j, q_j;
    }
    else {
        Run pumps #1, #2 and #3;
        Regulate ω_j to set Δp_j= Δp;
        Assign q_j=1/i;
        Record Δp_j, ω_j, P_j, q_j;
    }
}
```

More than three configuration cycles may be implemented as an algorithm (here as a c-style meta language) as follows:

```
k=1;
// run over all possible permutations of subsets j
for (j=1; j<2^N; j++){
    if (k=1){
        Run pump #1 at 95% speed;
        Assign q=1;
        Record Δp_j, ω_j, P_j, q_j;
        Δp= Δp_j;
        k=2;
    } else
        // determine i of subset j by counting 1-bits
        x=j;
        i=0;
        while (x≥1) {
            // mod(2) adds 1 if x is odd, 0 if x is even
            i+=x%2;
            x = floor(x/2);
        }
        // only run subsets of three pumps
        if (i≤3){
            // Run pump(s) according to the 1-bits of j
            x=j;
            bit =1;
            while (x≥1) {
                if(x%2==1) {
                    Run pump #bit;
                }
                x = floor(x/2);
                bit++;
            }
            Regulate ω_j to set Δp_j= Δp;
            Assign q=1/i;
            Record Δp_j, ω_j, P_j, q_j;
        }
}
```

In the above example for N=4 pumps, the algorithm would produce four cycles with one pump, six cycles with two pumps and four cycles with three pumps, i.e. in sum 14 cycles. A least squares method can be used to find average values for the parameters a, b c, x, y and z. Furthermore, outliers may be determined during redundant configuration cycles in order to neglect those in the averaging and/or to identify and ban low efficiency pumps of the multi-pump system 3. Such identified low efficiency pumps may be indicated for service, repair or replacement. It is preferred to run only subsets of three pumps, because cycles with subsets of many pumps only differ marginally from cycles with subsets of one more or less pump. In principle, however, the configuration cycles can be run with any number of pumps i≤N.

Figure 2:
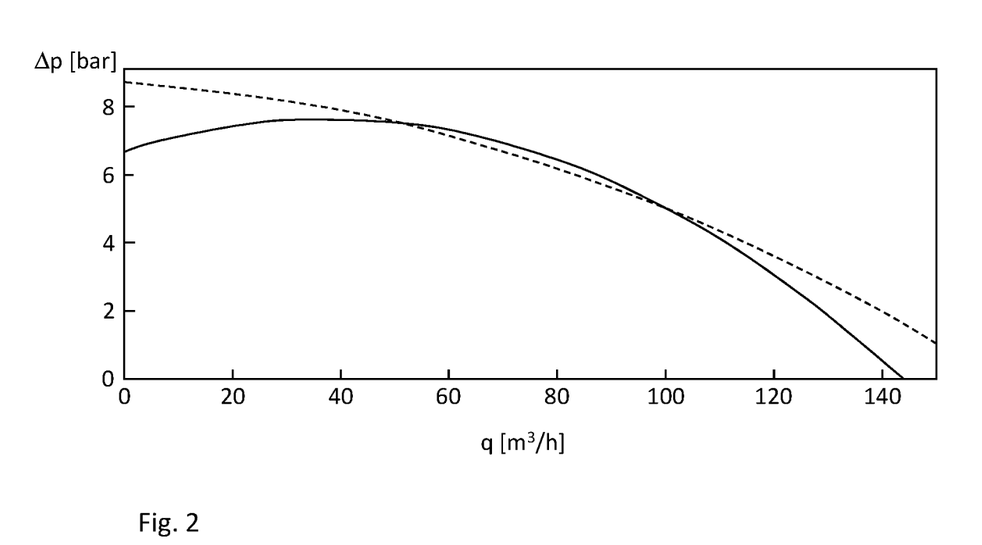
FIG. 2 is a diagram of an approximated pump characteristic.
Figure 3:
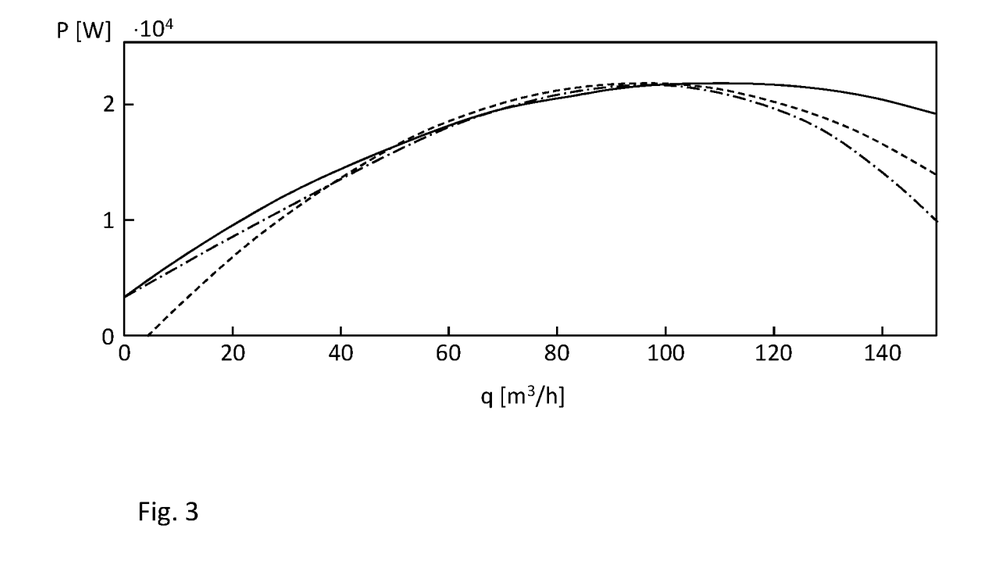
FIG. 3 is a diagram of an approximated power consumption.

FIGS. 2 and 3 show the resulting polynomial approximations as a dashed line. In some cases, as shown by the dashed lines, the approximated polynomials may not be accurate in certain areas. For instance, the dashed lines predict negative power consumption at very low flow, which is obviously not correct. This can be improved by running a zero configuration cycle as explained in the following.

Before a zero flow configuration cycle of the multi-pump system 3 with the four pumps 3a, 3b, 3c, and 3d, only a subset of three pumps 3a, 3b and 3c may be running at a speed w while pump 3d is not running. During the zero flow configuration cycle, pump 3d is ramped-up in speed. As long as the pressure differential provided by the current speed of pump 3d is below the total head $\Delta p$, pump 3d does not contribute to the total flow. Once the communication interface 13 receives a signal change indicative of the at least one pump starting to contribute to the total flow, the current speed $\omega_0$ of pump 3d is recorded in the moment the pump 3d starts to contribute to the total flow. The parameter c can then be determined from $\Delta p = c\omega_0^2$. The parameter c determined in the zero flow configuration cycle may be used to improve the polynomial approximations as shown by solid lines in FIGS. 2 and 3. As can be seen, there is no prediction of negative power consumption at low flow. The power consumption usually follows a slight S-shape which is usually better approximated by a third-order polynomial. However, the comparison with a third-order polynomial for approximating the power consumption in FIG. 3 (dashed-dotted line) shows that the overall prediction of the second-order approximation (solid) is quite good up to the maximum power consumption at about 100 m³/h after correction by the zero flow configuration.

Figure 4:
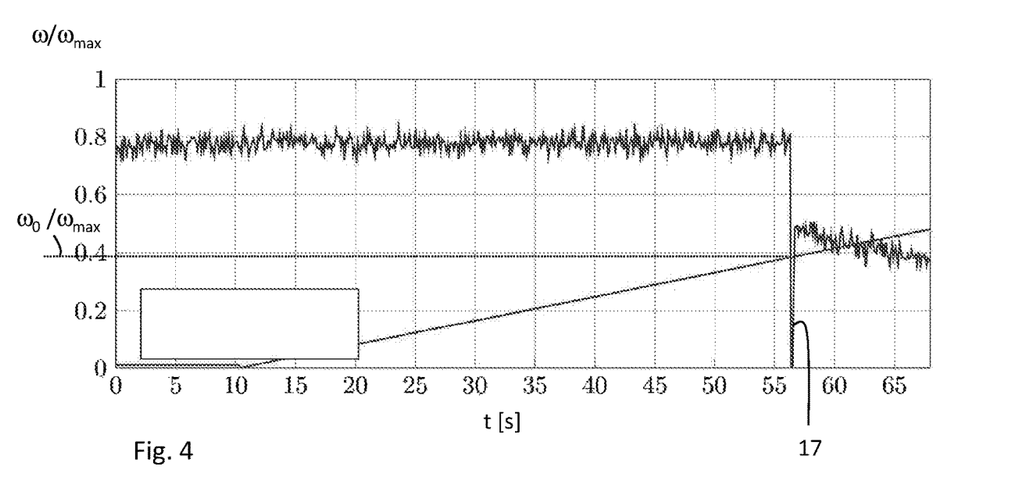
FIG. 4 is a diagram of the pump speed during ramp-up of an additional pump when a subset of pumps is already running.
Figure 5:
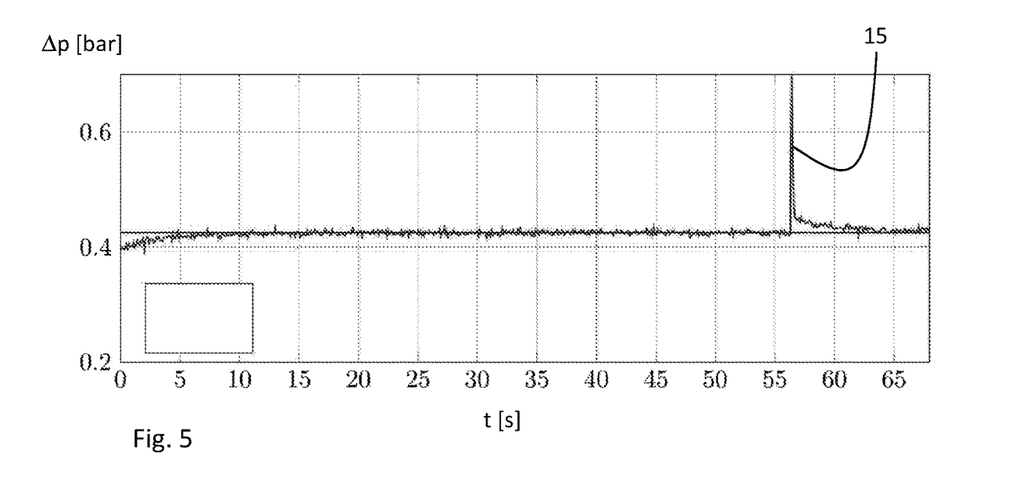
FIG. 5 is a diagram of the total head during ramp-up of an additional pump when a subset of pumps is already running.

FIGS. 4 and 5 show the sudden signal change for the speed (FIG. 3) and the pressure (FIG. 5) when the added pump 3d starts contributing to the flow. At the start of the ramp-up phase, the three running pumps 3a, 3b, 3c run constantly at about 80% of their maximum speed and provide all the flow. Pump 3d is linearly ramped-up at about 20% of the maximum speed per 25 seconds. When the speed $\omega_0$ at about 40% of the maximum speed is reached after about 57 seconds, the pressure differential of pump 3d equals the total head $\Delta p$ and pump 3d suddenly starts contributing to the flow. The control module 7 reacts immediately to keep the total head $\Delta p$ constant by reducing the speed of the running pumps 3a, 3b, 3c to about 40% of the maximum speed. The system may then converge towards a common speed of the new subset with i+1 pumps, i.e. of all four pumps, providing the same total head $\Delta p$ at about 40% of the maximum speed. However, the point when the added pump actively joins in, the sudden signal change shows as a disturbance in form of a spike (15) in pressure and a steep drop (17) in speed. A CUSUM algorithm can be used to detect this sudden signal change.

Optionally, the total head and/or flow may be held essentially constant during the ramping up/down of the at least one pump as shown in FIG. 5. In option a), i.e. when at least one pump is ramped up in addition to an already running subset j, the subset j may provide an essentially constant pressure and the ramped-up pump does not contribute to the flow until the speed $\omega_0$ is reached, which is just sufficient to provide that constant pressure. Analogously, in option b) (not shown), i.e. when at least one pump of a running subset j is ramped down, the subset j may provide an essentially constant pressure and the ramped-down pump still contributes to the flow until its speed falls below the speed $\omega_0$ which is at least necessary to provide that constant pressure. In both cases, this causes a sudden signal change that may show as a spike or steep drop in a diagram in which the speed, the pressure or the power consumption is recorded over the ramping time.

Optionally, the received signal change is identified by determining if the absolute value of the gradient in head $\Delta p$, speed $\omega_j$, and/or power consumption P is equal to or exceeds a pre-determined threshold value. Optionally, a change detection algorithm, for instance a cumulative sum (CUSUM) algorithm, is used for identifying the received signal change.

A CUSUM algorithm is particularly useful for detecting changes in the mean value of a signal. For instance, in view of a signal diagram over time, wherein the speed, the pressure or the power consumption is the signal, the positive and negative signal differences from its mean may be summed up to a monitored quantity. If the monitored quantity is equal to or exceeds a certain threshold, the mean value can be interpreted to have changed. Alternatively or in addition, the absolute value of the gradient in head $\Delta p$, speed $\omega_j$, and/or power consumption P may be measured and compared with a pre-determined threshold value. If the threshold value is reached or exceeded, the sudden signal change is indicative of the at least one pump starting to contribute to the total flow.

Figure 6:
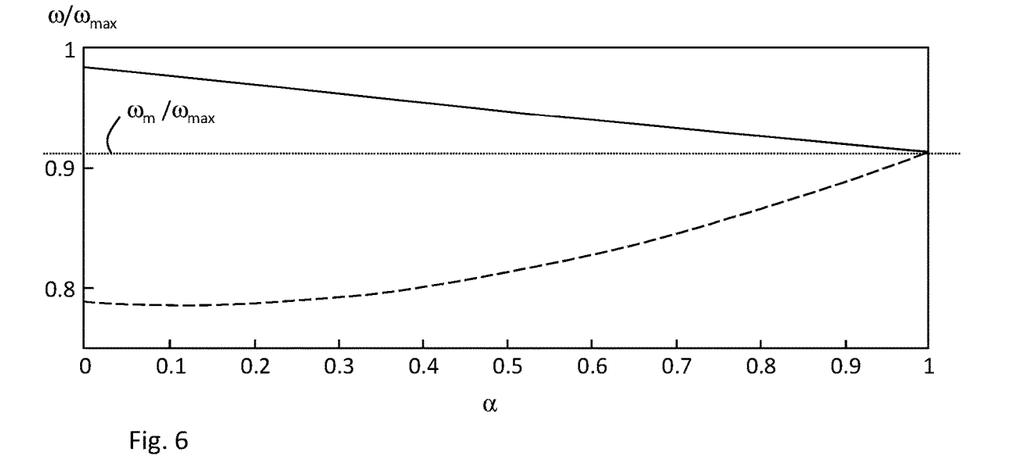
FIG. 6 is a diagram of the speed during an optimized ramp-up of an additional pump and ramp-down of an already running subset of pumps.

The disturbance is useful in the zero configuration cycle, but not desired for the normal pump operation when, for instance, the control unit decides that the system would consume less power with an additional pump, and therefore ramps up another pump. In this normal operation, optionally, the control module may be configured to ramp up the speed of the pump 3d in addition to the subset of the three pumps 3a, 3b, 3c running at speed $\omega_j$ providing a total head $\Delta p$, and simultaneously to ramp down the three pumps 3a, 3b, 3c from the speed $\omega_j$ to a lower speed $\omega_m$, wherein the speed $\omega_m$ is the speed required for the new subset of four pumps to provide the total head $\Delta p$. Such a simultaneous convergence of speeds is shown in FIG. 6, where the parameter $\alpha$ ranges from 0 (start of the ramping) and 1 (end of the ramping). The disturbance, as it is shown in FIGS. 4 and 5 for the zero flow configuration cycles, will be significantly reduced, because the running subset of three pumps 3a, 3b, 3c is already at the final speed $\omega_m$, when the fourth pump 3d joins in contributing flow at the same speed $\omega_m$. As any disturbance represents an energy-inefficiency, this simultaneous convergence saves power and may be referred to as "a smooth cutting in/out of pumps". The total head $\Delta p$ and/or the total flow are kept essentially constant during the ramping for all values of $\alpha$.

Knowledge of the speed $\omega_0$ and the approximated power consumption $P=f(q, \omega_j)$ and/or the approximated pump characteristic $\Delta p=f(q, \omega_j)$ may allow for the control module to ramp up/down following at least one pre-determined model curve. Thereby, the time for convergence after the added pumps actively joins in contributing flow can be significantly reduced, because the final speed $\omega_m$ can be predicted. Following the pre-determined model curve may automatically result in a constant total head $\Delta p$ and/or the total flow for all values of $\alpha$. Therefore, no feedback-loop for controlling based on monitored measured values may be needed.

If one or more pumps of a running subset are ramped down, the way back from parameter $\alpha$ at a value of 1 (start of the ramping) to 0 (end of the ramping) follows analogously. Similarly, also the zero flow configuration cycles may be run by ramping one or more pumps of a running subset down and recording the speed at which the ramped-down pump(s) suddenly stop contributing to the total flow.

Figure 7:
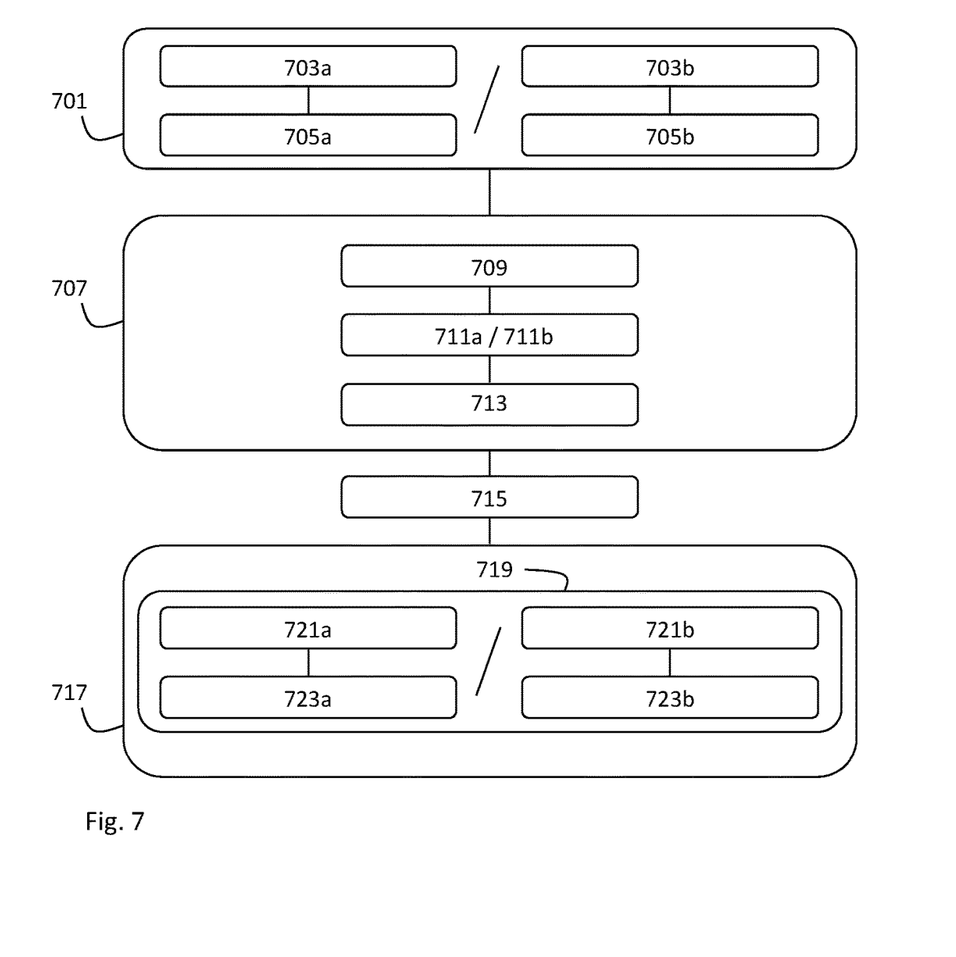
FIG. 7 is a flow diagram of an example of the method according to the present disclosure.

FIG. 7 shows an example of method steps in some subsequent order. However, the method may be implemented in a different order of steps, or the method steps may be repeated or executed in parallel to other method steps. In FIG. 7, a zero flow configuration cycle is run (701) by ramping up (703a) the speed of one pump in addition to a subset j of i pumps of a multi-pump system running at a speed $\omega_j$ until the communication interface receives a signal change indicative of the pump starting to contribute to the total flow, and determining (705a) an approximated pump characteristic $\Delta p = c\omega_0^2$ and power consumption $P = z\omega_0^3$, wherein $\omega_0$ is the speed of the ramped-up pump in the moment it starts to contribute to the total flow. Alternatively or in addition, the zero flow configuration cycle is run (701) by ramping down (703b) the speed of one pump of a subset j of i pumps of a multi-pump system running at a speed $\omega_j$ until the communication interface receives a signal change indicative of the pump stopping to contribute to the total flow, and determining (705b) an approximated pump characteristic $\Delta p = c\omega_0^2$ and power consumption $P = z\omega_0^3$, wherein $\omega_0$ is the speed of the ramped-down pump in the moment it stops to contribute to the total flow.

The method as shown in FIG. 7 further comprises running (707) n different configuration cycles with subsets of i pumps running at a speed $\omega_j$. During each configuration cycle j, signals indicative of operational parameters are received (709) from the running subset j. The method further comprises determining (711a) an approximated pump characteristic $$\Delta p_j(q, \omega_j) = a\left(\frac{q_j}{i}\right)^2 + b\left(\frac{q_j}{i}\right)\omega_j + c\omega_j^2$$

and determining (711b) a power consumption $$P_j(q, \omega_j) = x\left(\frac{q}{i}\right)^2 \omega_j + y\left(\frac{q}{i}\right)\omega_j^2 + z\omega_j^3$$

based on the received signals and under the assumption that the i pumps of each subset j share the same part q/i of a reference flow q. The pump characteristic (or parameters a, b and c indicative thereof) and the power consumption (or parameters x, y, and z indicative thereof) are then stored (713).

A subset k with the least power consumption for a required load is then determined (715) based on the approximated power consumption and/or the approximated pump characteristic stored in the storage module 13. The multi-pump system is then operated (717) by the determined subset k having the least power consumption for a required load. When it is energetically more efficient to change the running subset to i+1 or i−1 pumps, another pump may be smoothly cut in/out (719) by either:

ramping up (721a) the speed of a pump in addition to a subset j of i pumps running at a speed $\omega_j$ providing a total head $\Delta p$, and ramping down (723a) the i pumps of the subset j from the speed $\omega_j$ to a lower speed $\omega_m$, wherein the speed $\omega_m$ is the speed required for a subset m of i+1 pumps to provide the total head $\Delta p$; or
  ramping down (721b) the speed of a pump of a subset j of i pumps running at a speed $\omega_j$ providing a total head $\Delta p$, and ramping up (723b) the i−1 pumps of a residual subset r from the speed $\omega_j$ to a higher speed $\omega_r$, wherein the speed $\omega_r$ is the speed required for a residual subset r of i−1 pumps to provide the total head $\Delta p$.

Where, in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional, preferable, advantageous, convenient or the like are optional and do not limit the scope of the independent claims.

The above embodiments are to be understood as illustrative examples of the disclosure. It is to be understood that any feature described in relation to any one embodiment may be used alone, or in combination with other features described, and may also be used in combination with one or more features of any other of the embodiments, or any combination of any other of the embodiments. While at least one exemplary embodiment has been shown and described, it should be understood that other modifications, substitutions and alternatives are apparent to one of ordinary skill in the art and may be changed without departing from the scope of the subject matter described herein, and this application is intended to cover any adaptations or variations of the specific embodiments discussed herein.

In addition, "comprising" does not exclude other elements or steps, and "a" or "one" does not exclude a plural number. Furthermore, characteristics or steps which have been described with reference to one of the above exemplary embodiments may also be used in combination with other characteristics or steps of other exemplary embodiments described above. Method steps may be applied in any order or in parallel or may constitute a part or a more detailed version of another method step. It should be understood that there should be embodied within the scope of the patent warranted hereon all such modifications as reasonably and properly come within the scope of the contribution to the art. Such modifications, substitutions and alternatives can be made without departing from the spirit and scope of the disclosure, which should be determined from the appended claims and their legal equivalents.

While specific embodiments of the invention have been shown and described in detail to illustrate the application of the principles of the invention, it will be understood that the invention may be embodied otherwise without departing from such principles.

What is claimed is:

1. A multi-pump control system comprising:
  a processing module;
  a communication interface;
  a storage module; and
  a control module, wherein the control module is configured to:
    run a zero flow configuration cycle by ramping up a speed of at least one pump in addition to a subset j of i pumps of the multi-pump system running at a speed $\omega_j$ until the communication interface receives a signal change indicative of the at least one pump starting to contribute to a total flow, wherein the processing module is configured to determine an approximated pump characteristic $\Delta p \sim \omega_0^2$ and/or power consumption $P \sim \omega_0^3$, wherein $\omega_0$ is the speed of the at least one ramped-up pump at a time the at least one ramped-up pump starts to contribute to the total flow; or run a zero flow configuration cycle by ramping down the speed of at least one pump of a subset j of i pumps of a multi-pump system running at a speed $\omega_j$ until the communication interface receives a signal change indicative of the at least one pump stopping to contribute to the total flow, wherein the processing module is configured to determine an approximated pump characteristic $\Delta p \sim \omega_0^2$ and/or power consumption $P \sim \omega_0^3$, wherein $\omega_0$ is the speed of the at least one ramped-down pump in the moment it stops to contribute to the total flow; or run a zero flow configuration cycle by ramping up a speed of at least one pump in addition to a subset j of i pumps of the multi-pump system running at a speed $\omega_j$ until the communication interface receives a signal change indicative of the at least one pump starting to contribute to the total flow, wherein the processing module is configured to determine an approximated pump characteristic $\Delta p \sim \omega_0^2$ and/or power consumption $P \sim \omega_0^3$, wherein $\omega_0$ is the speed of the at least one ramped-up pump at a time the at least one ramped-up pump starts to contribute to the total flow and run a zero flow configuration cycle by ramping down the speed of at least one pump of a subset j of i pumps of a multi-pump system running at a speed $\omega_j$ until the communication interface receives a signal change indicative of the at least one pump stopping to contribute to the total flow, wherein the processing module is configured to determine an approximated pump characteristic $\Delta p \sim \omega_0^2$ and/or power consumption $P \sim \omega_0^3$, wherein $\omega_0$ is the speed of the at least one ramped-down pump in the moment it stops to contribute to the total flow.

2. The multi-pump control system according to claim 1, wherein the processing module is configured to identify the received signal change by using a change detection algorithm.

3. The multi-pump control system according to claim 1, wherein the processing module is configured to identify the received signal change by determining if an absolute value of the gradient in head $\Delta p$, or speed $\omega_j$, or power P or any combination of the gradient in head $\Delta p$, speed $\omega_j$, power P is equal to or exceeds a pre-determined threshold value.

4. The multi-pump control system according to claim 1, wherein the control module is configured to:

ramp up the speed of k pumps in addition to a subset j of i pumps of a multi-pump system comprising N pumps and running at a speed $\omega_j$ providing a total head $\Delta p$, wherein $N \geq 2$, $1 \leq k < N$ and $1 \leq i < N$, wherein the control module is configured to ramp down the i pumps of the subset j from the speed $\omega_j$ to a lower speed $\omega_m$, wherein the speed $\omega_m$ is the speed required for a subset m of i+k pumps to provide the total head $\Delta p$; or ramp down the speed of k pumps of a subset j of i pumps of a multi-pump system comprising N pumps and running at a speed $\omega_j$ providing a total head $\Delta p$, wherein $N \geq 2$, $1 \leq k < i$ and $1 < i \leq N$, wherein the control module is configured to ramp up the i−k pumps of a residual subset r from the speed $\omega_j$ to a higher speed $\omega_r$, wherein the speed $\omega_r$ is the speed required for a residual subset r of i−k pumps to provide the total head $\Delta p$; or ramp up the speed of k pumps in addition to a subset j of i pumps of a multi-pump system comprising N pumps and running at a speed $\omega_j$ providing a total head $\Delta p$, wherein $N \geq 2$, $1 \leq k < N$ and $1 \leq i < N$, wherein the control module is configured to ramp down the i pumps of the subset j from the speed $\omega_j$ to a lower speed $\omega_m$, wherein the speed $\omega_m$ is the speed required for a subset m of i+k pumps to provide the total head $\Delta p$ and ramp down the speed of k pumps of a subset j of i pumps of a multi-pump system comprising N pumps and running at a speed $\omega_j$ providing a total head $\Delta p$, wherein $N \geq 2$, $1 \leq k < i$ and $1 < i \leq N$, wherein the control module is configured to ramp up the i−k pumps of a residual subset r from the speed $\omega_j$ to a higher speed $\omega_r$, wherein the speed $\omega_r$ is the speed required for a residual subset r of i−k pumps to provide the total head $\Delta p$.

5. The multi-pump control system according to claim 4, wherein the control module is configured to keep the total head $\Delta p$ constant while ramping up or ramping down.

6. The multi-pump control system according to claim 4, wherein the control module is configured to ramp up or ramp down following at least one pre-determined model curve.

7. The multi-pump control system according to claim 1, wherein:

the control module is configured to run n different subsets of i pumps of a multi-pump system comprising N pumps during n different configuration cycles at a speed $\omega_j$ wherein $N \geq 2$, $2 \leq n \leq 2^N - 1$ and $1 \leq i \leq N$, wherein each configuration cycle $j \in \{1, \ldots, n\}$ is associated with a subset $j \in \{1, \ldots, n\}$ and a speed $\omega_j$;

the communication interface is configured to receive signals indicative of operational parameters from each subset j during the associated configuration cycle j;

the processing module is configured to determine an approximated pump characteristic $\Delta p = f(q, \omega_j)$ based on the received signals for each subset j and under an assumption that the i pumps of each subset j share the same part q/i of a reference flow q;

the storage module is configured to store the approximated pump characteristic $\Delta p = f(q, \omega_j)$ or parameters indicative thereof.

8. The multi-pump control system according to claim 7, wherein:

the processing module is further configured to determine an approximated pump power consumption $P = f(q, \omega_j)$ based on the received signals for each subset j and under the assumption that the i pumps of each subset j share the same part q/i of the reference flow q; and the storage module is further configured to store the approximated power consumption $P = f(q, \omega_j)$ or parameters indicative thereof.

9. The multi-pump control system according to claim 8, wherein the processing module is configured to determine an approximated power consumption $P = f(q, \omega_j)$ by determining parameters x, y and z of a second order polynomial $$P(q, \omega_j) = x\left(\frac{q}{i}\right)^2 \omega_j + y\left(\frac{q}{i}\right)\omega_j^2 + z\omega_j^3,$$

wherein the parameter z is determinable in the zero flow configuration cycle by $P = z\omega_0^3$.

10. The multi-pump control system according to claim 9, wherein the processing module is configured to determine the approximated pump characteristic $\Delta p = f(q, \omega_j)$ and/or power consumption $P = f(q, \omega_j)$ by a least squares method if a number of configuration cycles is equal to or exceeds a number of parameters to be determined.

11. The multi-pump control system according to claim 7, wherein the processing module is further configured to determine a subset k with a least power consumption for a required load based on an approximated power consumption $P = f(q, \omega_j)$ or based on an approximated pump characteristic $\Delta p=f(q, \omega_j)$ stored in the storage module or based on the approximated power consumption $P=f(q, \omega_j)$ and based on an approximated pump characteristic $\Delta p=f(q, \omega_j)$ stored in the storage module.

12. The multi-pump control system according to claim 11, wherein the control module is further configured to operate the multi-pump system with the determined subset k having the least power consumption for a required load.

13. The multi-pump control system according to claim 1, wherein the control module is further configured to run the i pumps of a subset j with the same speed $\omega_j$ during a configuration cycle j, wherein the speed $\omega_j$ of the i pumps of subset j in configuration cycle j differs from the speed $\omega_k$ of s pumps of a subset k in another configuration cycle k, wherein j≠s, wherein a total head $\Delta p$ generated by the multi-pump system is substantially the same for both configuration cycles j, k.

14. The multi-pump control system according to claim 1, wherein the processing module is configured to determine an approximated pump characteristic $\Delta p=f(q, \omega_j)$ by determining parameters a, b and c of a second order polynomial $$\Delta p(q, \omega_j) = a\left(\frac{q}{i}\right)^2 + b\left(\frac{q}{i}\right)\omega_j + c\omega_j^2,$$

wherein the parameter c is determinable in the zero flow configuration cycle by $\Delta p=c\omega_0^2$.

15. A method for controlling a multi-pump system, the method comprising the steps of:
  running a zero flow configuration cycle by ramping up the speed of at least one pump in addition to a subset j of i pumps of a multi-pump system running at a speed $\omega_j$ until receiving a signal change indicative of the at least one pump starting to contribute to a total flow and determining an approximated pump characteristic $\Delta p \sim \omega_0^2$ and/or power consumption $P \sim \omega_0^3$, wherein $\omega_0$ is the speed of the at least one ramped-up pump in the moment it starts to contribute to the total flow; or
  running a zero flow configuration cycle by ramping down the speed of at least one pump of a subset j of i pumps of a multi-pump system running at a speed $\omega_j$ until receiving a signal change indicative of the at least one pump stopping to contribute to the total flow and determining an approximated pump characteristic $\Delta p \sim \omega_0^2$ and/or power consumption $P \sim \omega_0^3$, wherein coo is the speed of the at least one ramped-down pump in the moment it stops to contribute to the total flow; or
  running a zero flow configuration cycle by ramping up the speed of at least one pump in addition to a subset j of i pumps of a multi-pump system running at a speed $\omega_j$ until receiving a signal change indicative of the at least one pump starting to contribute to the total flow and determining an approximated pump characteristic $\Delta p \sim \omega_0^2$ and/or power consumption $P \sim \omega_0^3$, wherein $\omega_0$ is the speed of the at least one ramped-up pump in the moment it starts to contribute to the total flow and running a zero flow configuration cycle by ramping down the speed of at least one pump of a subset j of i pumps of a multi-pump system running at a speed $\omega_j$ until receiving a signal change indicative of the at least one pump stopping to contribute to the total flow and determining an approximated pump characteristic $\Delta p \sim \omega_0^2$ and/or power consumption $P \sim \omega_0^3$, wherein $\omega_0$ is the speed of the at least one ramped-down pump in the moment it stops to contribute to the total flow.

16. The method according to claim 15, further comprising identifying the received signal change by using a change detection algorithm.

17. The method according to claim 15, further comprising identifying the received signal change by determining if the absolute value of the gradient in head $\Delta p$, speed $\omega_j$, and/or power P is equal to or exceeds a pre-determined threshold value.

18. The method according to claim 15, further comprising:
  ramping up the speed of k pumps in addition to a subset j of i pumps of the multi-pump system comprising N pumps and running at a speed $\omega_j$ providing a total head $\Delta p$, wherein N≥2, 1≤k<N and 1≤i<N and ramping down the i pumps of the subset j from the speed $\omega_j$ to a lower speed $\omega_m$, wherein the speed $\omega_m$ is the speed required for a subset m of i+k pumps to provide the total head $\Delta p$; or
  ramping down the speed of k pumps of a subset j of i pumps of the multi-pump system comprising N pumps and running at a speed $\omega_j$ providing a total head $\Delta p$, wherein N≥2, 1≤k<i and 1<i≤N, and ramping up the i−k pumps of a residual subset r from the speed $\omega_j$ to a higher speed $\omega_r$, wherein the speed $\omega_r$ is the speed required for a residual subset r of i−k pumps to provide the total head $\Delta p$; or
  ramping up the speed of k pumps in addition to a subset j of i pumps of the multi-pump system comprising N pumps and running at a speed $\omega_j$ providing a total head $\Delta p$, wherein N≥2, 1≤k<N and 1≤i<N and ramping down the i pumps of the subset j from the speed $\omega_j$ to a lower speed $\omega_m$, wherein the speed $\omega_m$ is the speed required for a subset m of i+k pumps to provide the total head $\Delta p$; and ramping down the speed of k pumps of a subset j of i pumps of the multi-pump system comprising N pumps and running at a speed $\omega_j$ providing a total head $\Delta p$, wherein N≥2, 1≤k<i and 1<i≤N, and ramping up the i−k pumps of a residual subset r from the speed $\omega_j$ to a higher speed $\omega_r$, wherein the speed $\omega_r$ is the speed required for a residual subset r of i−k pumps to provide the total head $\Delta p$.

19. The method according to claim 18, further comprising keeping the total head $\Delta p$ constant while ramping up or ramping down.

20. The method according to claim 18, wherein the ramping up and the ramping down follows at least one pre-determined model curve.

21. The method according to claim 15, further comprising: running n different subsets of i pumps of the multi-pump system comprising N pumps during n different configuration cycles at a speed $\omega_j$, wherein N≥2, 2≤n≤$2^N$−1 and 1≤i≤N, wherein each configuration cycle j∈{1, . . . , n} is associated with a subset j∈{1, . . . , n} and a speed $\omega_j$;
  receiving signals indicative of operational parameters from each subset j during the associated configuration cycle j;
  determining an approximated pump characteristic $\Delta p=f(q, \omega_j)$ based on the received signals for each subset j and under an assumption that the i pumps of each subset j share the same part q/i of a reference flow q;
  storing the approximated pump characteristic $\Delta p=f(q, \omega_j)$ or parameters indicative thereof.

22. The method according to claim 21, further comprising determining an approximated pump power consumption $P=f(q, \omega_j)$ based on the received signals for each subset j and under the assumption that the i pumps of each subset j share the same part q/i of the reference flow q, and storing the approximated power consumption $P=f(q, \omega_j)$ or parameters indicative thereof.

23. The method according to claim 21, further comprising determining a subset k with a least power consumption for a required load based on an approximated power consumption $P=f(q, \omega_j)$ and/or the approximated pump characteristic $\Delta p=f(q, \omega_j)$ stored in the storage module.

24. The method according to claim 21, further comprising running the i pumps of a subset j with the same speed $\omega_j$ during a configuration cycle j, wherein the speed $\omega_j$ of the i pumps of subset j in configuration cycle j differs from the speed $\omega_k$ of s pumps of a subset k in another configuration cycle k, wherein j≠s, wherein a total head $\Delta p$ generated by the multi-pump system is substantially the same for both configuration cycles j, k.

25. The method according to claim 21, further comprising determining an approximated pump characteristic $\Delta p=f(q)$ by determining parameters a, b and c of a second order polynomial $$\Delta p(q, \omega_j) = a\left(\frac{q}{i}\right)^2 + b\left(\frac{q}{i}\right)\omega_j + c\omega_j^2,$$

wherein the parameter c is determined in the zero flow configuration cycle by $\Delta p=c\omega_0^2$.

26. The method according to claim 25, further comprising determining an approximated power consumption $P=f(q)$ by determining parameters x, y and z of a second order polynomial $$P(q, \omega_j) = x\left(\frac{q}{i}\right)^2 \omega_j + y\left(\frac{q}{i}\right)\omega_j^2 + z\omega_j^3,$$

wherein the parameter z is determined in the zero flow configuration cycle by $P=z\omega_0^3$.

27. The method according to claim 15, further comprising operating the multi-pump system with the determined subset k having the least power consumption for a required load.

28. The method according to claim 15, further comprising determining the approximated pump characteristic $\Delta p=f(q, \omega_j)$ or power consumption $P=f(q, \omega_j)$ by a least squares method if a number of configuration cycles is equal to or exceeds a number of parameters to be determined.

29. The method according to claim 15, wherein a computer readable non-transitory medium is provided with instructions for executing the method steps.

* * * * *